United States Patent
Shao et al.

(10) Patent No.: US 11,966,412 B2
(45) Date of Patent: Apr. 23, 2024

(54) BLOCKCHAIN DATA PROCESSING METHOD AND APPARATUS, DEVICE, AND READABLE STORAGE MEDIUM

(71) Applicant: Jingdong Technology Information Technology Co., Ltd., Beijing (CN)

(72) Inventors: Zhuguang Shao, Beijing (CN); Shuang Zhang, Beijing (CN); Guangwei Zhao, Beijing (CN)

(73) Assignee: Jingdong Technology Information Technology Co., Ltd., Beijing (CN)

( * ) Notice: Subject to any disclaimer, the term of this patent is extended or adjusted under 35 U.S.C. 154(b) by 141 days.

(21) Appl. No.: 17/627,458

(22) PCT Filed: May 12, 2020

(86) PCT No.: PCT/CN2020/089803
§ 371 (c)(1),
(2) Date: Jan. 14, 2022

(87) PCT Pub. No.: WO2021/051830
PCT Pub. Date: Mar. 25, 2021

(65) Prior Publication Data
US 2022/0261415 A1    Aug. 18, 2022

(30) Foreign Application Priority Data
Sep. 17, 2019   (CN) .......................... 201910878095.X

(51) Int. Cl.
*G06F 16/25*     (2019.01)
*G06F 16/22*     (2019.01)
(Continued)

(52) U.S. Cl.
CPC ........ *G06F 16/258* (2019.01); *G06F 16/2282* (2019.01); *G06F 16/2365* (2019.01); *G06F 16/242* (2019.01); *G06F 16/245* (2019.01)

(58) Field of Classification Search
CPC .............. G06F 16/258; G06F 16/2282; G06F 16/2365; G06F 16/242; G06F 16/245; G06F 16/9024; G06F 16/2433; G06F 16/284

See application file for complete search history.

(56) References Cited

U.S. PATENT DOCUMENTS

2002/0161757 A1 * 10/2002 Mock ...................... G06F 16/24
707/999.005
2015/0149509 A1 * 5/2015 Leu .......................... G06F 16/27
707/803

(Continued)

FOREIGN PATENT DOCUMENTS

AU    2018241565 A1 * 7/2019 ......... G06F 16/1805
AU    2018241565 B2 * 5/2020 ......... G06F 16/1805
(Continued)

OTHER PUBLICATIONS

The Notice of Reasons for Refusal for Japanese Patent Application No. 2022-507639, dated May 9, 2023.
(Continued)

*Primary Examiner* — James E Richardson

(57) ABSTRACT

Provided are a blockchain data processing method and apparatus, a device, and a readable storage medium. By storing a data type information table in a relational database in advance, the data type information table is used for storing storage information of all the data types, and the storage information includes a table corresponding to the data type, a mapping relationship between the service field of the Value of the data type and a table field in the corresponding table, and a data format of the Value of the data type. A data type of the Value is determined when the Key-Value data needs to be stored; and a target table corresponding to the data type of the Value is determined (Continued)

and the Key-Value data is written into the target table according to the data type information table.

18 Claims, 6 Drawing Sheets

(51) Int. Cl.
*G06F 16/23* (2019.01)
*G06F 16/242* (2019.01)
*G06F 16/245* (2019.01)

(56) References Cited

U.S. PATENT DOCUMENTS

| | | | |
|---|---|---|---|
| 2016/0253382 | A1 | 9/2016 | Shadmon |
| 2019/0050459 | A1 | 2/2019 | Griffith et al. |
| 2019/0171838 | A1 | 6/2019 | Struttmann |
| 2019/0179951 | A1 | 6/2019 | Brunet et al. |
| 2020/0026700 | A1* | 1/2020 | Qiu ................. G06F 16/212 |
| 2020/0183905 | A1* | 6/2020 | Wang ............... G06F 16/2246 |

FOREIGN PATENT DOCUMENTS

| | | | |
|---|---|---|---|
| CN | 103902698 | A | 7/2014 |
| CN | 103902701 | A | 7/2014 |
| CN | 107239479 | A | 10/2017 |
| CN | 107247757 | A | 10/2017 |
| CN | 107332847 | A * | 11/2017 ............. H04L 63/08 |
| CN | 108959562 | A | 12/2018 |
| CN | 109086325 | A | 12/2018 |
| CN | 1091189782 | A | 1/2019 |
| CN | 109656886 | A | 4/2019 |
| CN | 109684335 | A | 4/2019 |
| CN | 110059092 | A | 7/2019 |
| CN | 110096522 | A | 8/2019 |
| CN | 110110005 | A | 8/2019 |
| CN | 110222086 | A | 9/2019 |
| CN | 110609839 | A | 12/2019 |
| JP | 2012-178455 | A | 9/2012 |
| JP | 2014-48741 | A | 3/2014 |
| JP | 2016-149049 | A | 8/2016 |
| JP | 2016-170453 | A | 9/2016 |
| WO | WO2018135766 | A1 | 7/2018 |
| WO | WO-2018177252 | A1 * | 10/2018 ......... G06F 16/1805 |

OTHER PUBLICATIONS

Wang Qian-ge et al., "Survey of Data Storage and Query Techniques in Blockchain Systems", Computer Science, vol. 45 No. 12, Dec. 2018, DOI 10.11896/j.issn. 1002-137X. 2018. 12. 002.

Fariz Azmi Pratama et al., "Query Support for Data Processing and Analysis on Ethereum Blockchain", pp. 1-5, Jan. 10, 2019, 2018 International Symposium on Electronics and Smart Devices.

International Search Report dated Aug. 11, 2020 for PCT application No. PCT/CN2020/089803.

* cited by examiner

BLOCKCHAIN DATA PROCESSING METHOD AND APPARATUS, DEVICE, AND READABLE STORAGE MEDIUM

CROSS-REFERENCE TO RELATED APPLICATIONS

This application is a National Stage of International Application No. PCT/CN2020/089803, filed on May 12, 2020, which claims priority to Chinese patent application No. 201910878095.X, entitled "Blockchain Data Processing Method and Apparatus, Device, and Readable Storage Medium", and filed on Sep. 17, 2019. Both of the above applications are hereby incorporated by reference in their entireties.

TECHNICAL FIELD

The present disclosure relates to the field of blockchain technology and, in particular, to a blockchain data processing method and apparatus, a device and a readable storage medium.

BACKGROUND

With the development of blockchain technology, more and more data begins to be stored and interacted by using a blockchain. In the blockchain technology, data is generated and superimposed one by one in a form of a block according to a chronological order, so as to form a chain data structure, and each block records transaction information that occurs at a corresponding time.

SUMMARY

The present disclosure provides a blockchain data processing method and apparatus, a device and a readable storage medium.

One aspect of the present disclosure provides a blockchain data processing method, including:

analyzing a Value in Key-Value data to determine a data type of the Value when the Key-Value data needs to be stored;

determining a target table corresponding to the data type of the Value according to a data type information table, wherein the data type information table is used to store storage information of all data types, and storage information of the data type includes a table corresponding to the data type, a mapping relationship between a service field of the Value of the data type and a table field in a corresponding table, and a data format of the Value of the data type; and writing the Key-Value data into the target table according to the data type information table.

Another aspect of the present disclosure provides a blockchain data processing apparatus, including:

a data analyzing module, configured to analyze a Value in Key-Value data to determine a data type of the Value when the Key-Value data needs to be stored;

a data writing module, configured to determine a target table corresponding to the data type of the Value according to a data type information table, wherein the data type information table is used to store storage information of all data types, and the storage information of the data type includes a table corresponding to the data type, a mapping relationship between a service field of the Value of the data type and a table field in a corresponding table, and a data format of the Value of the data type; and the data writing module is further configured to write the Key-Value data into the target table according to the data type information table.

Another aspect of the present disclosure provides a computing device, including:

a processor, a memory, and a computer program stored in the memory and executed by the processor; and when the processor executes the computer program, the blockchain data processing method above is implemented.

Another aspect of the present disclosure provides a computer-readable storage medium, having a computer program stored thereon, when the computer program is executed by a processor, the blockchain data processing method above is implemented.

Another aspect of the present disclosure provides a chip running an instruction, where the chip includes a memory, a processor, the memory stores a code and data, the memory is coupled with the processor, and the processor runs the code in the memory to enable the chip to perform steps of the blockchain data processing method above.

Another aspect of the present disclosure provides a program product including an instruction, where the program product, when running on a computer, causes the computer to perform steps of the blockchain data processing method above.

Another aspect of the present disclosure provides a computer program, when executed by a processor, performs steps of the blockchain data processing method above.

Figure 1:
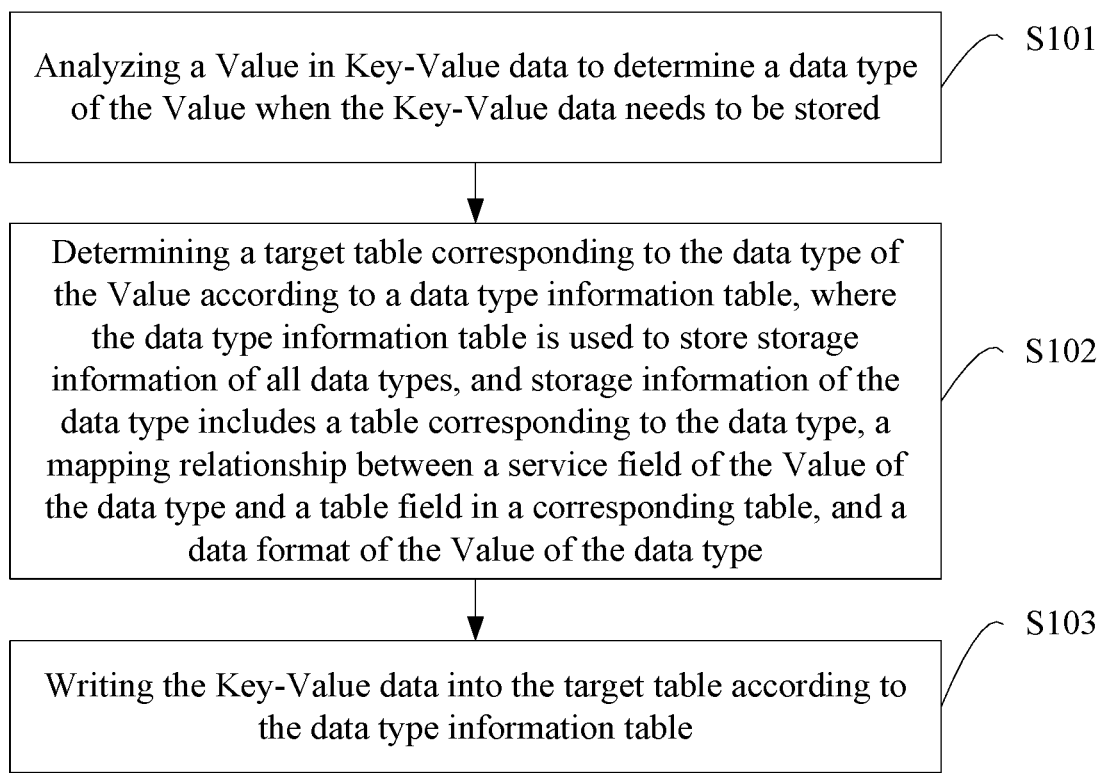
FIG. 1 is a flowchart of a blockchain data processing method provided by Embodiment 1 of the present disclosure.

Through the above drawings, the specific embodiments of the present disclosure have been shown, which will be described in detail below. These drawings and text description are not intended to limit the scope of the conception the present disclosure in any way, but to explain the concept of the present disclosure to those skilled in the art by referring to specific embodiments.

DESCRIPTION OF EMBODIMENTS

Illustrative embodiments will be described in detail here, and examples thereof are shown in the accompanying drawings. When the following description refers to the drawings, unless otherwise indicated, the same numbers in different drawings indicate the same or similar elements. The implementations described in the following illustrative embodiments do not represent all implementations consistent with the present disclosure. On the contrary, they are merely examples of apparatuses and methods consistent with some aspects of the present disclosure as detailed in the appended claims.

The terms "first", "second" and the like referred to herein are for descriptive purposes only and are not to be understood as indicating or implying relative importance or implicitly indicating the number of indicated technical features. In the following description of the embodiments, the meaning of "a plurality of" is more than two, unless specifically defined otherwise.

The present disclosure is specifically applied to a blockchain system, and the data in the blockchain system employs with a Key-Value storage model to store data in a form of key-value pairs. In the embodiment, the data storage of the blockchain system is united with the relational database by using the relational database to store the data and intervening from an API interface of the database operation. When a piece of Key-Value data needs to be stored in the blockchain system, the Key-Value data is integrated and stored in the relational database, and the query of the blockchain data in the relational database is supported.

In the blockchain data processing method provided in the embodiment, an application scenario is: analyzing a Value in Key-Value data to determine a data type of the Value when the blockchain system needs to store the Key-Value data; determining a target table corresponding to the data type of the Value according to a data type information table; and writing the Key-Value data into the target table according to the data type information table.

Another application scenario is: when the blockchain system needs to query data, if a designated Key, a data type and a business field are used for data query, acquiring a key, a data type and a service field of the data to be queried; querying a data type information table according to the data type of the data to be queried, and determining a second target table corresponding to the data type of the data to be queried; and querying the second target table according to the key data and the service field of the data to be queried to obtain a query result.

Another application scenario is: when the blockchain system needs to query data, if inputting a query statement (such as a SQL statement) that is used for data query, analyzing the query statement to determine a data type and a business field of the data to be queried; replacing the data type in the query statement with a corresponding table name according to the storage information of the data type of the data to be queried, and replacing the business field in the query statement with the corresponding table field to generate a new query statement; and executing the new query statement to obtain a query result.

The method in this embodiment is applied to a computing device for performing blockchain data processing in a blockchain system.

With the development of blockchain technology, more and more data begins to be stored and interacted by using a blockchain. In the blockchain technology, data is generated and superimposed one by one in a form of a block according to a chronological order, so as to form a chain data structure, and each block records transaction information that occurs at a corresponding time.

Because of the uncertainty of a blockchain storage data structure, most blockchain systems use a key-value storage model to store data in a form of key-value pairs. However, at present, main logic of application layers of most service systems is based on a relational database for data processing, which is different from the Key-Value storage model used by the blockchain, so that the data of the blockchain cannot be connected to an application layer. The blockchain in the prior art does not support query of some specific conditions or query of complex logic, causing low query efficiency.

Embodiments of the present disclosure provide a blockchain data processing method and apparatus, a device and a readable storage medium, which are used to solve the problem that the blockchain in the prior art does not support the query of some specific conditions or the query of complex logic, the query efficiency is low, and it is unable to connect to the application layer.

The technical solution of the present disclosure and how the technical solution of the present application solves the above technical problem are described in detail below with reference to specific embodiments. The following several specific embodiments may be combined with each other, and the same or similar concepts or processes may not be repeated in some embodiments. Embodiments of the present disclosure will be described below with reference to the accompanying drawings.

Embodiment 1

FIG. 1 is a flowchart of a blockchain data processing method provided by Embodiment 1 of the present disclosure. The embodiment of the present disclosure provides a blockchain data processing method to solve the problem that the existing blockchain does not support the query of some specific conditions or the query of complex logic and the query efficiency is low.

As shown in FIG. 1, the method includes the following specific steps.

Step S101, analyzing a Value in Key-Value data to determine a data type of the Value when the Key-Value data needs to be stored.

In general, in a blockchain system, a blockchain data may be written into a Key-Value database in the following two ways. One way is Put (Key, Value), and the Key and the Value are given; and another way is Write (Value), and the Value is given, but the Key is not defined.

In the embodiment, in order to store the blockchain data of the Key-Value structure into a relational database, the format of the Value of the blockchain data is predefined, and the Value in the Key-Value data generated in the blockchain system includes a data type, a data format, a number of fields, and a value of the Value.

Where the data type represents a service classification of the Value, that is, a service classification of the transaction information corresponding to the Value, and the data type may be mapped to a table name of the relational database.

The data format represents a type of the Value of the data type, such as a JSON format, or classified by a separator or the like. In addition, the same data type corresponds to the same data format, and for the same data type, it is not allowed to store different data formats, so that the complexity of the whole system is reduced, and the system stability is ensured.

The number of fields indicates the number of fields of the data type, and the same data type corresponds to the same number of fields, and for the same data type, it is not allowed to set multiple numbers of fields. In addition, the number of fields of the data type may be set to be not less than the number of fields of the current actual Value.

In the embodiment, when the Key-Value data needs to be stored in any one way in the blockchain system, the Value in the Key-Value data is analyzed according to the Value format, and the data type, the data format, the number of fields and the value of the Value may be determined.

Step S102, determining a target table corresponding to the data type of the Value according to a data type information table, where the data type information table is used to store storage information of all data types, and storage information of the data type includes a table corresponding to the data type, a mapping relationship between a service field of the Value of the data type and a table field in a corresponding table, and a data format of the Value of the data type.

In the embodiment, the data type information table is maintained in the relational database in advance, and the data type information table is used to store the storage information of all data types. The storage information of the data type includes the table corresponding to the data type, the mapping relationship between the service field of the Value of the data type and the table field in the corresponding table, and a data format of the value of the data type. Where the table corresponding to a certain data type may be one or more.

Exemplarily, the table structure of the data type information table may be as shown in Table 1 below.

TABLE 1

| ID | Data type | Table name | Table field name | Data format | Service field identification |
|----|-----------|------------|------------------|-------------|------------------------------|

Where the service field identification may be a service field name or a service field order number, and so on.

For example, it is supposed that there are two data types: Person and Student. The data type information table may include the data shown in Table 2 below.

TABLE 2

| ID | Data type | Table name | Table field name | Data format | Service field identification |
|----|-----------|------------|------------------|-------------|------------------------------|
| 1  | Person    | td_000     | column1          | JSON        | name |
| 2  | Person    | td_000     | column2          | JSON        | age |
| 3  | Student   | td_001     | column1          | SPLIT(,)    | 0 |
| 4  | Student   | td_001     | column2          | SPLIT(,)    | 1 |
| 5  | Student   | td_001     | column3          | SPLIT(,)    | 2 |

As shown in Table 2, according to two rows of data in ID 1 and ID 2, it is known that the Person service data is stored in Table td_000, the stored data format is JSON, a name attribute in the JSON format is a first service field (the service field name is "name"), and the corresponding table field is column 1; and the age attribute is a second service field (the service field name is "age"), and the corresponding table field is column 2.

According to the three rows of data in ID 3-ID 5, Student service data is stored in table td_001, and the stored data format is "Split (,)", which represents a classification according to a comma separator. The first segment is a first service field (order 0) and the corresponding table field is column 1; and the second segment is a second service field (order 1), and the corresponding table field is column 2 and so on.

In addition, the table field column 0 may be reserved for storing the Key.

After determining the data type of the Value, in the step, the data type information table is queried according to the data type of the Value to determine a target table corresponding to the data type of the Value.

Step S103, writing the Key-Value data into the target table according to the data type information table.

After determining the target table which the key-value data is written into, the storage information of the data type of the Value from the data type information table is acquired, and the Key value and the value of each service field in the Value are written into the corresponding table field of the target table, according to the mapping relationship between the service field of the Value of the data type and the table field in the corresponding table, and the data format of the Value of the data type.

Exemplarily, a reserved specified field may be used in the table corresponding to the data type to store the Key value.

According to the embodiment of the disclosure, by storing a data type information table in the relational database in advance, the data type information table is used for storing storage information of all the data types, and the storage information of the data type includes the table corresponding to the data type, the mapping relationship between the service field of the Value of the data type and the table field in the corresponding table, and a data format of the value of the data type, so that the mapping between the table in the relational database and the service data in the blockchain is realized. A Value in a Key-Value data is analyzed to determine a data type of the Value when the Key-Value data needs to be stored; and a target table corresponding to the data type of the Value is determined and the Key-Value data is written into the target table according to the data type information table, thereby realizing storing the blockchain data based on the relational database, supporting the data query of the application layer service system based on the relational database, and improving the query efficiency.

Embodiment 2

Figure 2:
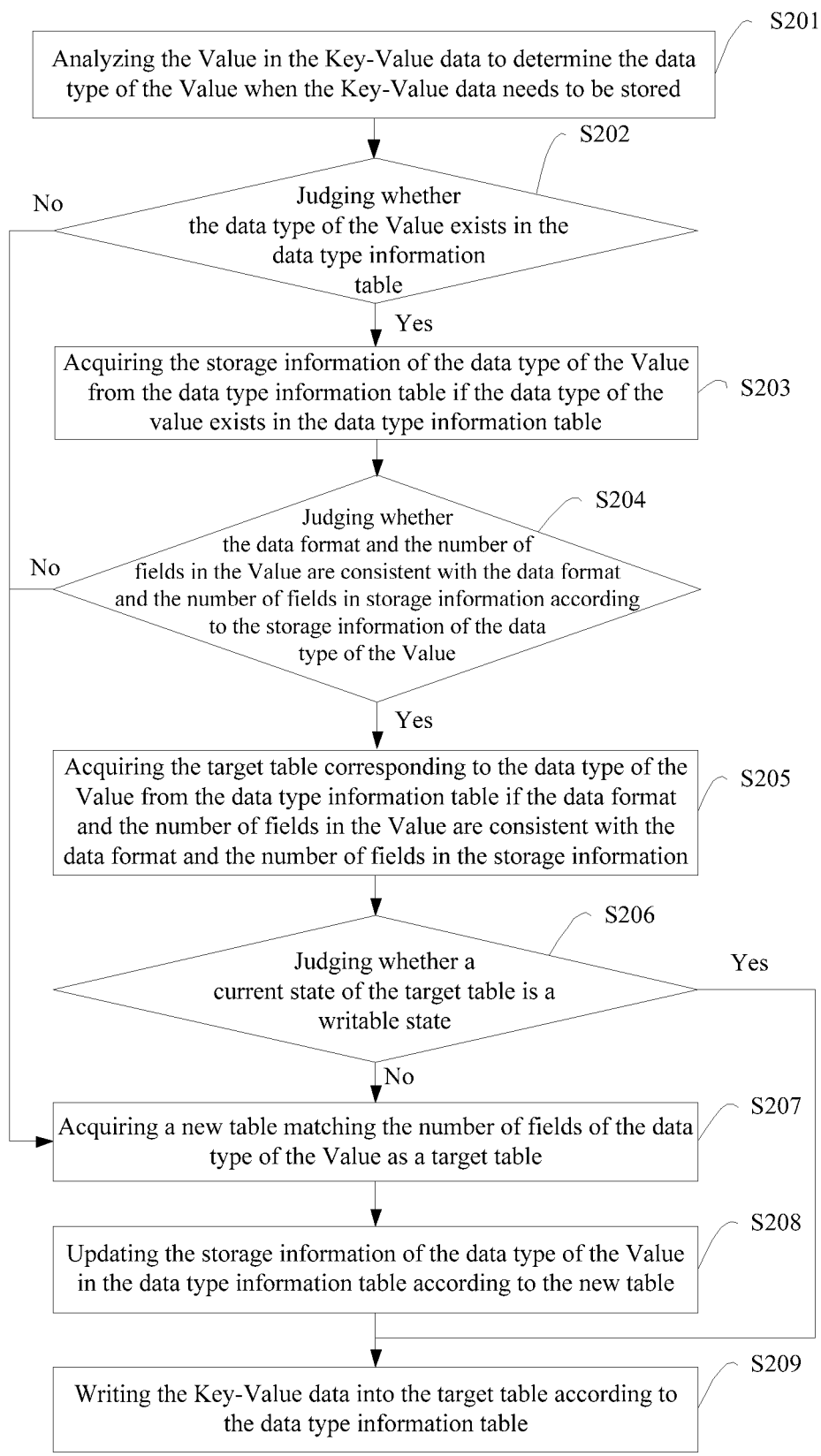
FIG. 2 is a flowchart of a blockchain data processing method provided by Embodiment 2 of the present disclosure.

FIG. 2 is a flowchart of a blockchain data processing method provided by Embodiment 2 of the present disclosure. On the basis of the Embodiment 1, in the embodiment, the Value includes a data type, a data format, a number of fields, and a value of the Value. Determining a target table corresponding to the data type of the Value according to a data type information table includes: judging whether the data type of the Value exists in the data type information table; if the data type of the Value exists in the data type information table, acquiring storage information of the data type of the Value from the data type information table; judging whether the data format and the number of fields in the Value are consistent with the data format and the number of fields in storage information according to the storage information of the data type of the Value; and if yes, acquiring a target table corresponding to the data type of the Value from the data type information table. If the data type of the Value does not exist in the data type information table, or the data format and the number of fields of the Value are inconsistent with the data format and the number of fields in the storage information, a new table matching the data format and the number of fields in the storage information is acquired as a target table; and the storage information of the data type of the Value in the data type information table is updated according to the new table.

As shown in FIG. 2, the method includes the following specific steps.

Step S201, analyzing the Value in the Key-Value data to determine the data type of the Value when the Key-Value data needs to be stored.

The step is consistent with the above step S101, and details will be not repeated herein.

In the embodiment, after determining the data type of the Value, step S202-S208 are used as an implementation of determining the target table corresponding to the data type of the Value according to a data type information table.

In an embodiment, when analyzing the value in the key-value data, it is firstly determined that whether the Value in the Key-Value data meets the Value format requirement. If the Value does not meet the Value format requirement, the Key-Value data may not be stored in the relational database, and an abnormal prompt for data writing can be performed. If the Value meets the Value format requirement, the subsequent steps continue to be executed.

Step S202, judging whether the data type of the Value exists in the data type information table.

Where the data type information table is used to store storage information of all the data types, and the storage information of the data type includes a table corresponding to the data type, a mapping relationship between a service field of the Value of the data type and a table field in the corresponding table, and a data format of the Value of the data type.

In addition, the detailed description of the data type information table is seen in step S102, and details will be not repeated herein.

In the embodiment, it is firstly determined that whether the data type of the Value exists in the data type information table. If the data type of the Value exists in the data type information table, step S203 is executed, and the storage information of the data type of the Value is directly acquired from the data type information table.

If the data type of the Value does not exist in the data type information table, steps S207-S208 are executed, and a new table is acquired as the target table, and the storage information of the data type of the Value in the data type information table is updated according to the new table.

Step S203, acquiring the storage information of the data type of the Value from the data type information table if the data type of the value exists in the data type information table.

Step S204, judging whether the data format and the number of fields in the Value are consistent with the data format and the number of fields in storage information according to the storage information of the data type of the Value.

In the embodiment, after acquiring the storage information of the data type of the Value from the data type information table, it is determined that whether the data format in the Value is consistent with the data format in the storage information, and whether the number of fields in the Value is consistent with the number of fields in the storage information according to the mapping relationship between the service field of the Value of the data type and the table field in the corresponding table and the data format of Value of the data type in the storage information.

If the data format and the number of fields in the Value are consistent with the data format and the number of fields in the storage information, step S205 is executed, and the target table corresponding to the data type of the Value is acquired from the data type information table.

If the data format of the Value is inconsistent with the data format in the storage information, or if the number of fields of the Value is inconsistent with the number of fields in the storage information, steps S207-S208 are executed, a new table is acquired as the target table, and the storage information of the data type of the Value in the data type information table is updated according to the new table.

Step S205, acquiring the target table corresponding to the data type of the Value from the data type information table if the data format and the number of fields in the Value are consistent with the data format and the number of fields in the storage information.

Step S206, judging whether a current state of the target table is a writable state.

In the embodiment, a state of the table corresponding to each data type is added, which is used to describe whether the table is writable. The state of the target table includes a writable state and a non-writable state.

Exemplarily, a state information table may be maintained in the relational database for storing the state of each table. For example, the state information table includes at least the following fields: table name and table state; and the state information table may further include the number of fields.

In the embodiment, the table corresponding to each data type is initially set as a writable state, and the state of the table is updated in real time according to the size of the amount of storage data in the table, so as to prevent the single table from being too large, thereby improving the query efficiency.

Exemplarily, the computing device detects whether the number of rows of each table reaches a preset threshold; and if the number of rows of a certain table reaches the preset threshold, the state of the table is updated to the non-writable state. Where the preset threshold may be set by a person skilled in the art according to actual application scenarios and needs, which is not specifically limited herein.

In an embodiment, the computing device may update the state of each table according to a preset policy by using a separate thread, for example, updating once every other time, updating regularly, updating in real time, etc., and the present embodiment does not specifically limit the preset policy for updating the state of each table.

In addition, because the requirements for the amount of data in each table are not very strict, the complex logic processing such as locks may not be added.

After acquiring the target table corresponding to the data type of the Value from the data type information table, in the step, the current state of the target table is determined, and if the target table is in the non-writable state, steps S207-S208 are executed, a new table is acquired as the target table, and the storage information of the data type of the Value in the data type information table is updated according to the new table.

If the target table is in the writable state, step S209 is executed, and the Key-Value data is written into the target table according to the data type information table.

Step S207, acquiring a new table matching the number of fields of the data type of the Value as a target table.

As a possible implementation, a new table matching the number of fields of the data type of the Value may be directly created as a target table.

As another possible implementation, an empty table with a specified number of fields may be pre-created, where the specified number of fields may be one or more number of fields with a higher frequency of use. In the step, according to the number of fields of the data type of the Value, a pre-created empty table consistent with the number of fields of the data type of the Value is directly acquired as a target table. In this way, an table building operation in the data writing process may be saved, and the data writing efficiency may be improved.

Exemplarily, the computing device may maintain an idle table information table, where the idle table information table is used to store information of the created empty table, the information may include at least a table name and a corresponding number of fields thereof, and may further include a table state. The idle table information table is queried according to the number of fields of the data type of the Value to determine whether there is a pre-created empty table consistent with the number of fields of the data type of the Value; if so, the pre-created empty table consistent with the number of fields of the data type of the Value is acquired directly, and if not, a table consistent with the number of fields in the storage information is created as the target table, according to the number of fields of the data type of the Value.

In addition, if not, after creating the table consistent with the number of fields of the data type of the Value, according to the number of fields of the data type of the Value, the state of the table is set to the writable state, and the state information of the table is written into the state information table.

In the embodiment, the idle table information table and the state information table may be combined into a storage table, which is not specifically limited by the embodiment herein.

Step S208, updating the storage information of the data type of the Value in the data type information table according to the new table.

After acquiring the new table matching the number of fields of the data type of the Value as the target table, a piece of storage information of the data type of the Value is generated according to the information of the new table, the mapping relationship between the table field of the new table and the service field of the Value, the data format corresponding to the data type of the Value, and the like; and the piece of the storage information is written into the data type information table to update the storage information of the data type of the Value in the data type information table according to the new table.

Step S209, writing the Key-Value data into the target table according to the data type information table.

In the embodiment, a reserved specified field in the table corresponding to the data type may be used to store the Key value.

After determining the target table corresponding to the data type of the Value, the value of each service field of the Value is analyzed according to the data format of the Value corresponding to the data type of the Value in the data type information table; the value of the service field of the Value is written into the corresponding table field in the target table, and the Key of the Key-Value data is written into the specified field of the target table.

In addition, if the data to-be-written does not include the Key, only the value of the service field of the Value needs to be written into the corresponding table field in the target table.

According to the embodiment of the disclosure, by storing a data type information table in the relational database in advance, the data type information table is used for storing storage information of all the data types, and the storage information of the data type includes the table corresponding to the data type, the mapping relationship between the service field of the Value of the data type and the table field in the corresponding table, and a data format of the value of the data type, so that the mapping between the table in the relational database and the service data in the blockchain is realized, and the number of tables in the relational database is controlled within a certain range, which generally keeps the performance of the database stable and prevents decline of database performance due to excessive table data. A Value in a Key-Value data is analyzed to determine a data type of the Value when the Key-Value data needs to be stored; and a target table corresponding to the data type of the Value is determined and the Key-Value data is written into the target table according to the data type information table, thereby realizing storing the blockchain data based on the relational database, supporting the data query of the application layer service system based on the relational database, and improving the query efficiency. And further, by setting whether the table is in the writable state according to the size of the amount of data in the table, the state of the table is updated to the non-writable state if the number of rows in the table reaches a preset threshold; and if the target table is in the non-writable state, a new table matching the number of fields in the storage information is acquired as the target table, which can prevent a single table from being too large, and further improve the query efficiency.

Embodiment 3

Figure 3:
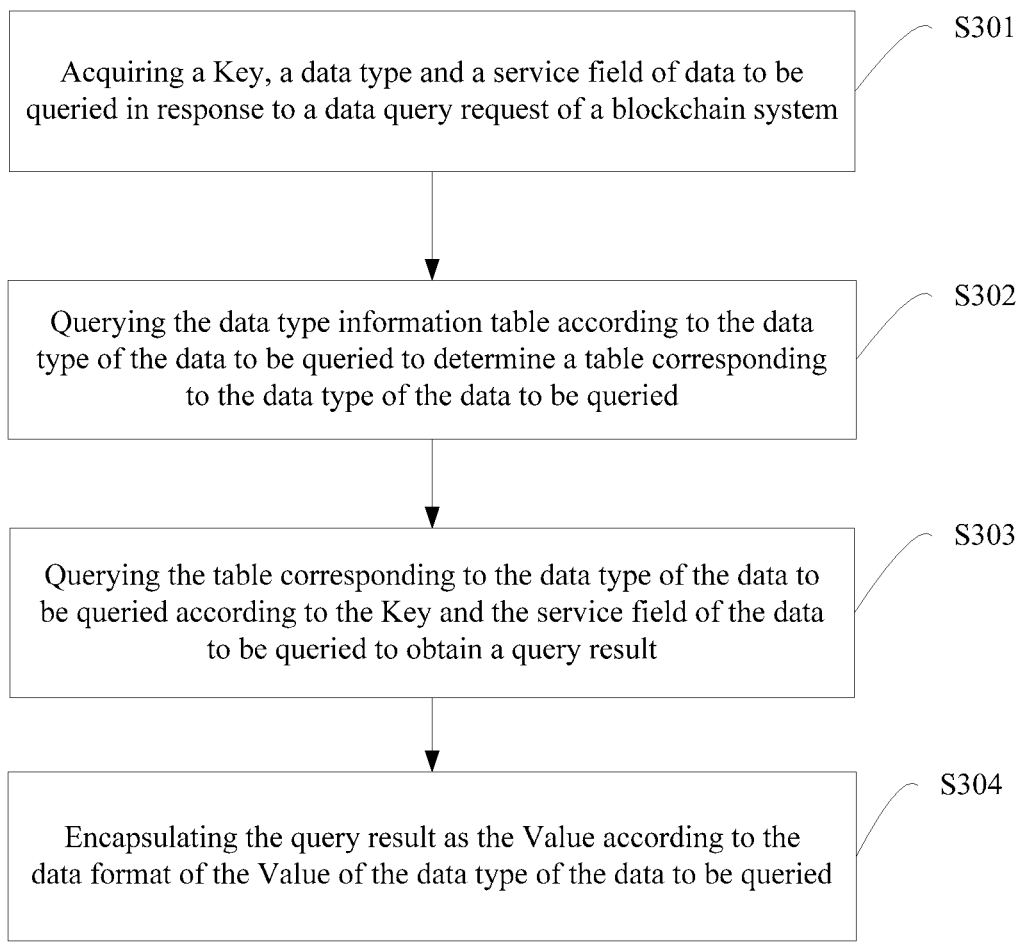
FIG. 3 is a flowchart of a blockchain data processing method provided by Embodiment 3 of the present disclosure.

FIG. 3 is a flowchart of a blockchain data processing method provided by Embodiment 3 of the present disclosure. On the basis of Embodiment 1 or Embodiment 2 above, in the embodiment, the process of performing a blockchain data query is exemplified when a Key, a data type, and a service field of the data to be queried are known. As shown in FIG. 3, the specific steps of the method are as follows.

Step S301, acquiring a Key, a data type and a service field of data to be queried in response to a data query request of a blockchain system.

The embodiment supports data query in the following ways: the first one is to query all fields by specifying the Key and the data type, which may be expressed as QueryAll (Key, DataType), where DataType represents the data type; and the second one is to query by specifying the Key, the data type and the service field, which may be expressed as QueryFields (Key, DataType, fields [ ]), where the DataType represents the data type, and fields [ ] represents the specified one or more service fields.

Where the second querying way may be considered as a one-time encapsulation of the first querying way, and may also be expressed as QueryFields (Key, DataType, *), where DataType represents the data type, and "*" represents querying all the service fields.

In the embodiment, after receiving the data query request, the computing device extracts the Key, the data type, and the service field of the data to be queried in the data query request. Where the data query request may not include the service field of the data to be queried, and in this case, the values of all the service fields are queried.

Step S302, querying the data type information table according to the data type of the data to be queried to determine a table corresponding to the data type of the data to be queried.

The data type information table is queried according to the data type specified by the data query request to determine the table corresponding to the specified data type.

Since the amount of data stored in each table is limited, there may be one or more tables corresponding to a data type.

Step S303, querying the table corresponding to the data type of the data to be queried according to the Key and the service field of the data to be queried to obtain a query result.

In this step, after determining the table corresponding to the data type specified in the data query request, the table field corresponding to the service field of the data to be queried is acquired according to the mapping relationship between the service field of the Value of the data type and the table field in the corresponding table in the storage information of the data type specified in the data query request; and then the table corresponding to the data type of the data to be queried is acquired to obtain the query result, according to the Key of the data to be queried and the table field corresponding to the service field of the data to be queried.

Exemplarily, the corresponding query statement may be generated according to the Key of the data to be queried, the table field corresponding to the service field of the data to be queried, and the table corresponding to the data type of the data to be queried; and the query result may be obtained by executing the query statement. The query statement may be a SQL statement, etc.

Step S304, encapsulating the query result as the Value according to the data format of the Value of the data type of the data to be queried.

This step is an optional step. After obtaining the query result in step S303, the query result may be directly fed back to the user, or after encapsulating the query result as Value in step S304, an encapsulated Value is fed back to the user.

After obtaining the query result, the query result may also encapsulated as the Value according to the data format of the Value in the storage information of the data type of the data to be queried.

Exemplarily, if the data format of the Value in the storage information of the data type of the data to be queried is JSON, the query result is encapsulated as a JSON string.

Exemplarily, if the data format of the Value in the storage information of the data type of the data to be queried is classified according to a separator, the query result is assembled into a formatted string by the separator.

According to the embodiment of the disclosure, by storing a data type information table in the relational database in advance, the data type information table is used for storing storage information of all the data types, and the storage information of the data type includes the table corresponding to the data type, the mapping relationship between the service field of the Value of the data type and the table field in the corresponding table, and a data format of the value of the data type, so that the mapping between the table in the relational database and the service data in the blockchain is realized, and the storage of the blockchain data based on the relational database can be achieved. A Key, a data type and a service field of data to be queried are acquired in response to a data query request of a blockchain system; a data type information table is queried according to the data type of the data to be queried to determine a table corresponding to the data type of the data to be queried; and the table corresponding to the data type of the data to be queried is queried according to the Key and the service field of the data to be queried to obtain a query result, thereby realizing the data query based on the relational database, and improving the query efficiency.

Embodiment 4

Figure 4:
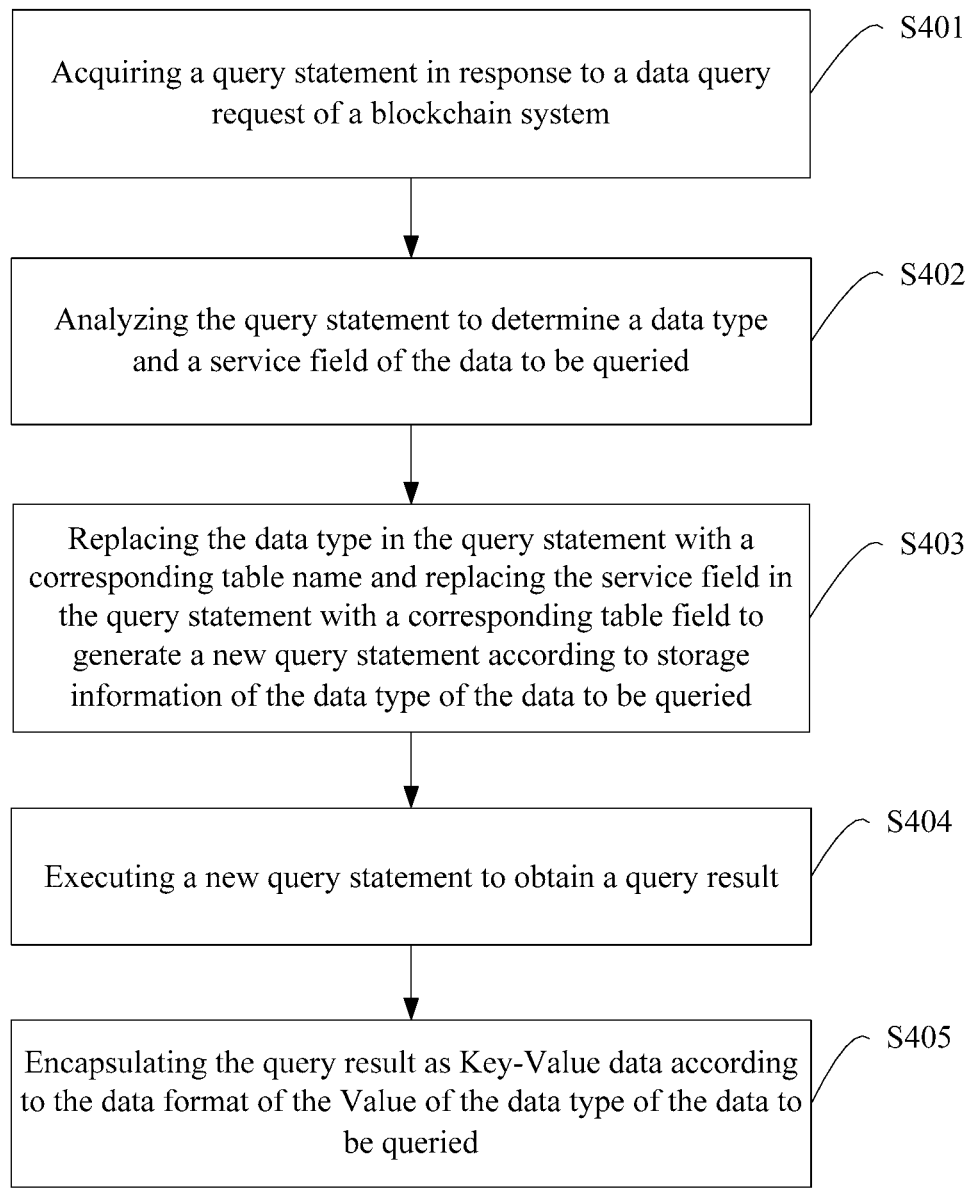
FIG. 4 is a flowchart of a blockchain data processing method provided by Embodiment 4 of the present disclosure.

FIG. 4 is a flowchart of a blockchain data processing method provided by Embodiment 4 of the present disclosure. On the basis of any one of the Embodiments 1 to 3 above, the process of performing a blockchain data query is exemplified when a query statement is known in the embodiment. As shown in FIG. 4, specific steps of the method are as follows.

Step S401, acquiring a query statement in response to a data query request of a blockchain system.

The embodiment supports querying a blockchain data in a relational database through a query statement.

In the embodiment, after receiving the data query request, the computing device extracts the query statement in the data query request. Where the query statement may be a SQL statement, etc.

Step S402, analyzing the query statement to determine a data type and a service field of the data to be queried.

A table name in the query statement is acquired by analyzing the query statement to obtain the data type of the data to be queried; and a query field in the query statement is acquired to obtain the service field to be queried.

Step S403, replacing the data type in the query statement with a corresponding table name and replacing the service field in the query statement with a corresponding table field to generate a new query statement according to storage information of the data type of the data to be queried.

After determining the data type of the data to be queried and the service field to be queried, the computing device determines the storage information of the data type of the data to be queried by querying the data type information table; determines a table corresponding to the data type of the data to be queried and a table field corresponding to the service field to be queried, according to the mapping relationship between the service field of Value of the data type in the storage information and the table field in the corresponding table; and replaces the data type in the query statement with the corresponding table name and replaces the service field to be queried in the query statement with the corresponding table field to generate a new query statement.

Exemplarily, if there are multiple tables corresponding to the data type of the data to be queried, then for each table, the data type in the query statement is replaced with a table name of the table and the service field to be queried in the query statement is replaced with the corresponding table field to generate a new query statement. In this way, multiple new query statements may be obtained.

Exemplarily, if there are multiple tables corresponding to the data type of the data to be queried, a new joint query statement may also be generated.

Step S404, executing a new query statement to obtain a query result.

If there are multiple new query statements, each new query statement may be separately executed to obtain a query result corresponding to each new query statement, and then the query result corresponding to each new query statement is summarized to obtain a final query result.

Step S405, encapsulating the query result as Key-Value data according to the data format of the Value of the data type of the data to be queried.

This step is optional. After the query result is obtained in step S404, the query result may be directly fed back to the user; or after the query result is encapsulated as the Key-Value data through step S405, an encapsulated Key-Value data may be fed back to the user.

After obtaining the query result, the query result may also encapsulated as the Key-Value data according to the data format of the Value in the storage information of the data type of the data to be queried.

Exemplarily, if the data format of the Value in the storage information of the data type of the data to be queried is JSON, the Value data in the query result is encapsulated as a JSON string.

Exemplarily, if the data format of the Value in the storage information of the data type of the data to be queried is classified according to a separator, the Value data in the query result is assembled into a formatted string by the separator.

According to the embodiment of the disclosure, by storing a data type information table in the relational database in advance, the data type information table is used for storing storage information of all the data types, and the storage information of the data type includes the table corresponding to the data type, the mapping relationship between the service field of the Value of the data type and the table field in the corresponding table, and a data format of the value of the data type, so that the mapping between the table in the relational database and the service data in the blockchain is realized, and the storage of the blockchain data based on the relational database can be achieved. A query statement is acquired in response to a data query request of a blockchain system; the query statement is analyzed to determine a data type and a service field of the data to be queried; the data type in the query statement is replaced with the corresponding table name and the service field in the query statement is replaced with the corresponding table field to generate a new query statement, according to storage information of the data type of the data to be queried; and a new query statement is executed to obtain a query result, thereby realizing the data query based on the relational database, and improving the query efficiency.

Embodiment 5

Figure 5:
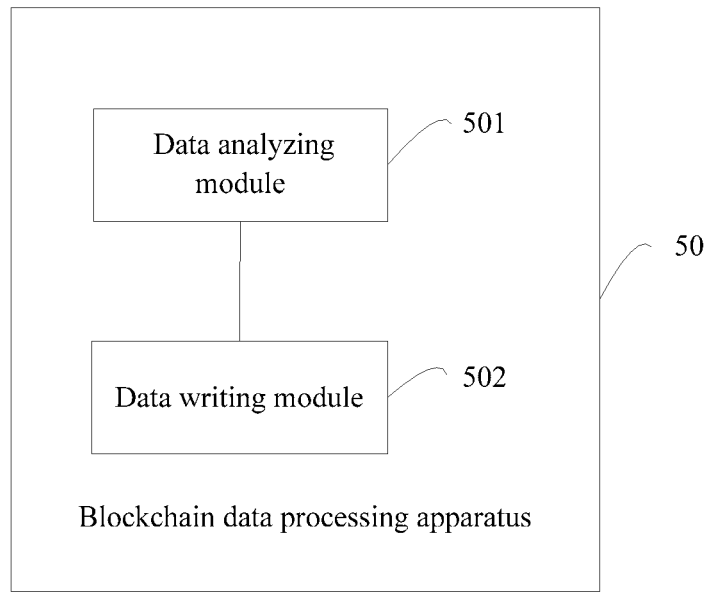
FIG. 5 is a schematic structural diagram of a blockchain data processing apparatus provided by Embodiment 5 of the present disclosure.

FIG. 5 is a schematic structural diagram of a blockchain data processing apparatus provided by Embodiment 5 of the present disclosure. The blockchain data processing apparatus provided in the embodiment of the present disclosure may execute the processing flows provided in the blockchain data processing method embodiments. As shown in FIG. 5, the blockchain data processing apparatus 50 includes: a data analyzing module 501 and a data writing module 502.

Specifically, the data a analyzing module 501 is used to analyze a Value in a Key-Value data to determine a data type of the Value when the Key-Value data needs to be stored.

The data writing module 502 is configured to determine a target table corresponding to the data type of the Value according to a data type information table, where the data type information table is used to store storage information of all data types, and the storage information of the data type includes a table corresponding to the data type, a mapping relationship between a service field of the Value of the data type and a table field in the corresponding table, and a data format of the Value of the data type.

The data writing module 502 is further configured to write the Key-Value data into the target table according to the data type information table.

The apparatus provided in the embodiment of the present disclosure may be specifically used to execute the method provided in Embodiment 1 above, and the specific functions are not repeated here.

According to the embodiment of the disclosure, by storing a data type information table in the relational database in advance, the data type information table is used for storing storage information of all the data types, and the storage information of the data type includes the table corresponding to the data type, the mapping relationship between the service field of the Value of the data type and the table field in the corresponding table, and a data format of the value of the data type, so that the mapping between the table in the relational database and the service data in the blockchain is realized. A Value in a Key-Value data is analyzed to determine a data type of the Value when the Key-Value data needs to be stored; and a target table corresponding to the data type of the Value is determined and the Key-Value data is written into the target table according to the data type information table, thereby realizing storing the blockchain data based on the relational database, supporting the data query of the application layer service system based on the relational database, and improving the query efficiency.

Embodiment 6

Figure 6:
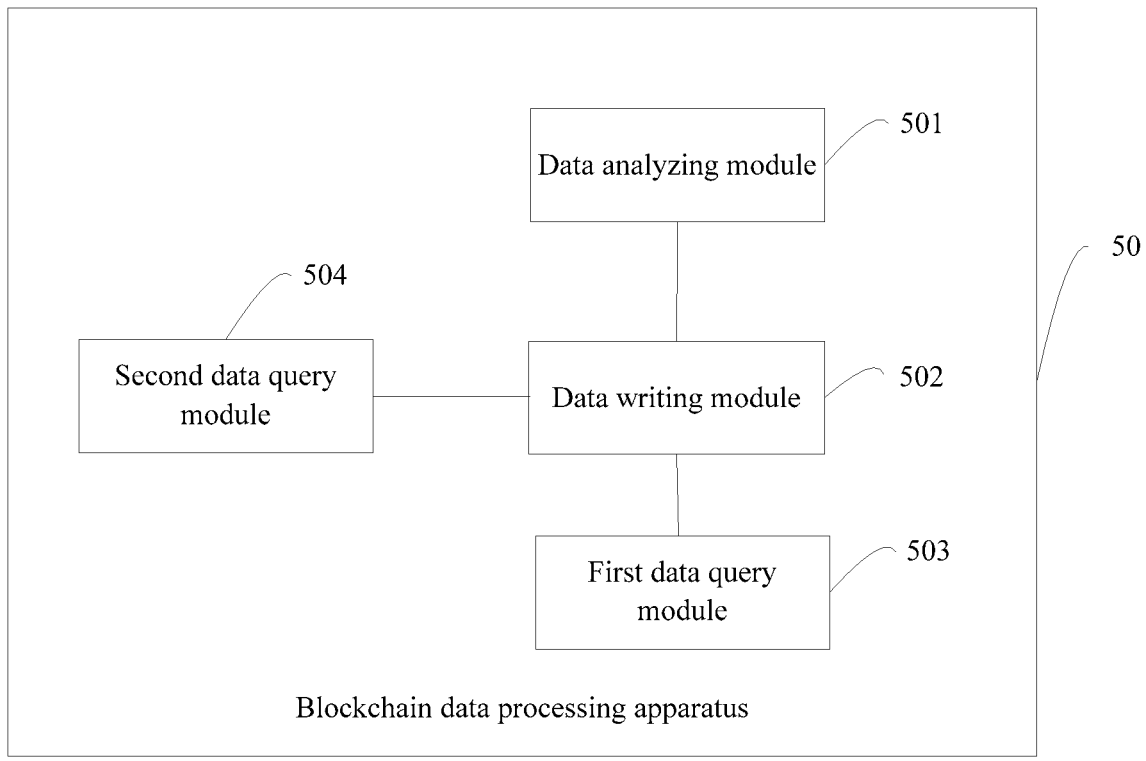
FIG. 6 is a schematic structural diagram of a blockchain data processing apparatus provided by Embodiment 6 of the present disclosure.

FIG. 6 is a schematic structural diagram of a blockchain data processing apparatus provided by Embodiment 6 of the present disclosure. On the basis of the Embodiment 5 above, in the embodiment, a Value includes a data type, a data format, a number of fields, and a value of the Value. The data writing module is further configured to:

judge whether the data type of the Value exists in the data type information table; if the data type of the Value exists in the data type information table, acquire storage information of the data type of the Value from the data type information table; judge whether the data format and the number of fields in the Value are consistent with the data format and the number of fields in storage information according to the storage information of the data type of the Value; and acquire the target table corresponding to the data type of the Value from the data type information table if the data format and the number of fields in the Value are consistent with the data format and the number of fields in the storage information.

In an embodiment, the data writing module is further configured to:

acquire a new table matching the data format and the number of fields in the storage information as a target table if the data type of the Value does not exist in the data type information table; and update the storage information of the data type of the Value in the data type information table according to the new table.

In an embodiment, the data writing module is further configured to:

acquire a new table matching the data format and the number of fields in the storage information as a target table if the data format of the Value is inconsistent with the data format in the storage information, or if the number of fields of the Value is inconsistent with the number of fields in the storage information; and update the storage information of the data type of the Value in the data type information table according to the new table.

In an embodiment, the data writing module is further configured to:

determine a current state of the target table, where the state of the target table includes a writable state and a non-writable state; acquire a new table matching the number of fields in the storage information as the target table if the target table is in the non-writable; update the storage information of the data type of the Value in the data type information table according to the new table; and execute a step of writing Key-Value data into the target table according to the data type information table if the target table is in the writable state.

In an embodiment, the data writing module is further configured to:

detect whether the number of rows of the target table reaches a preset threshold; and update the state of the target table to a non-writable state if the number of rows of the target table reaches the preset threshold.

In an embodiment, the data writing module is further configured to:

write the Key of the Key-Value data into a specified field of the target table; and write the value of the service field of the Value into the corresponding table field in the target table according to the storage information of the data type of the Value.

In an embodiment, as shown in FIG. 6, the blockchain data processing apparatus 50 may further include a first data query module 503.

The first data query module 503 is configured to:

acquire a Key, a data type and a service field of data to be queried in response to a data query request of a blockchain system; query a data type information table according to the data type of the data to be queried to determine a table corresponding to the data type of the data to be queried; and query the table corresponding to the data type of the data to be queried according to the Key and the service field of the data to be queried to obtain a query result.

In an embodiment, the first data query module 503 is further configured to:

encapsulate the query result as Value according to the data format of Value of the data type of the data to be queried.

In an embodiment, as shown in FIG. 6, the blockchain data processing apparatus 50 may further include a second data query module 504.

The second data query module 504 is configured to:

acquire a query statement in response to a data query request of a blockchain system; analyze the query statement to determine a data type and a service field of the data to be queried; replace the data type in the query statement with the corresponding table name and replace the service field in the query statement with the corresponding table field to generate a new query statement, according to storage information of the data type of the data to be queried; and execute the new query statement to obtain a query result.

In an embodiment, the second data query module 504 is further configured to:

encapsulate the query result as Key-Value data according to the data format of the Value of the data type of the data to be queried.

The apparatus provided in the embodiment of the present disclosure may be specifically used to execute the method provided in any one of the Embodiments 2 to 4 above, and specific functions are not described herein again.

According to the embodiment of the disclosure, by storing a data type information table in the relational database in advance, the data type information table is used for storing storage information of all the data types, and the storage information of the data type includes the table corresponding to the data type, the mapping relationship between the service field of the Value of the data type and the table field in the corresponding table, and a data format of the value of the data type, so that the mapping between the table in the relational database and the service data in the blockchain is realized, and the number of tables in the relational database is controlled within a certain range, which generally keeps the performance of the database stable and prevents decline of database performance due to excessive table data. A Value in a Key-Value data is analyzed to determine a data type of the Value when the Key-Value data needs to be stored; and a target table corresponding to the data type of the Value is determined and the Key-Value data is written into the target table according to the data type information table, thereby realizing storing the blockchain data based on the relational database, supporting the data query of the application layer service system based on the relational database, and improving the query efficiency. And further, by setting whether the table is in the writable state according to the size of the amount of data in the table, the state of the table is updated to the non-writable state if the number of rows in the table reaches a preset threshold; and if the target table is in the non-writable state, a new table matching the number of fields in the storage information is acquired as the target table, which can prevent a single table from being too large, and further improve the query efficiency.

Embodiment 7

Figure 7:
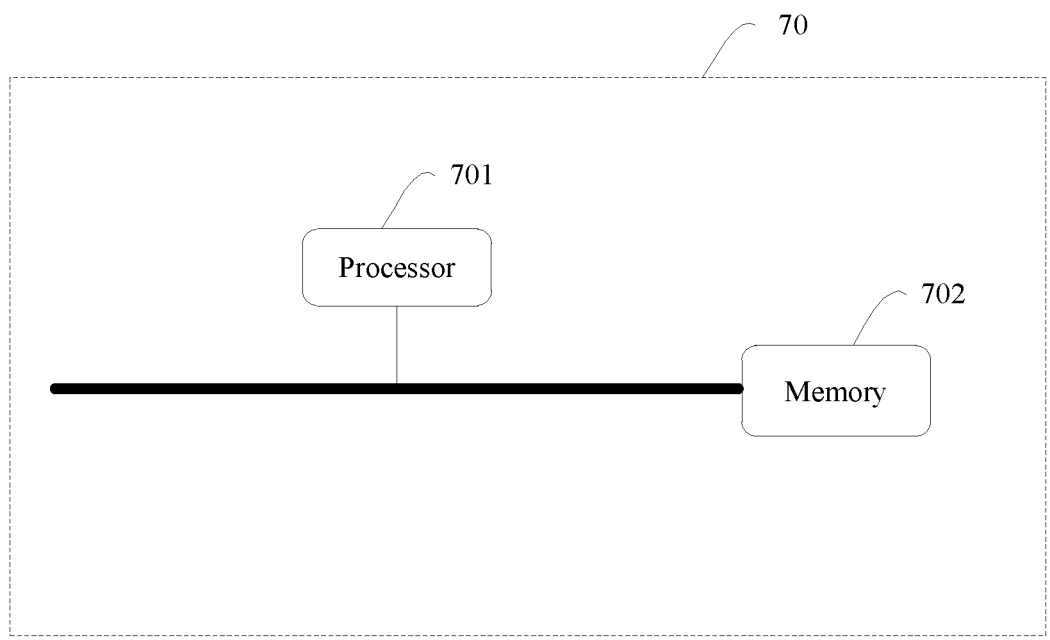
FIG. 7 is a schematic structural diagram of a computing device provided by Embodiment 7 of the present disclosure.

FIG. 7 is a schematic structural diagram of a computing device provided by Embodiment 7 of the present disclosure. As shown in FIG. 7, the computing device 70 includes a processor 701, a memory 702, and a computer program stored in the memory 702 and executed by the processor 701.

Where the processor 701 implements the blockchain data processing method provided by any of the above method embodiments when running the computer program.

According to the embodiment of the disclosure, by storing a data type information table in the relational database in advance, the data type information table is used for storing storage information of all the data types, and the storage information of the data type includes the table corresponding to the data type, the mapping relationship between the service field of the Value of the data type and the table field in the corresponding table, and a data format of the value of the data type, so that the mapping between the table in the relational database and the service data in the blockchain is realized. A Value in a Key-Value data is analyzed to determine a data type of the Value when the Key-Value data needs to be stored; and a target table corresponding to the data type of the Value is determined and the Key-Value data is written into the target table according to the data type information table, thereby realizing storing the blockchain data based on the relational database, supporting the data query of the application layer service system based on the relational database, and improving the query efficiency.

In addition, an embodiment of the present disclosure also provides a computer-readable storage medium that stores a computer program which, when executed by a processor, implements the blockchain data processing method provided by any one of the above method embodiments.

In addition, an embodiment of the present disclosure also provides a chip running an instruction, where the chip includes a memory, a processor, the memory stores a code and data, the memory is coupled with the processor, and the processor runs the code in the memory to enable the chip to perform steps of the above blockchain data processing method.

In addition, an embodiment of the present disclosure also provides a program product, where the program product, when running on a computer, causes the computer to perform steps of the above blockchain data processing method.

In addition, an embodiment of the present disclosure also provides a computer program, where the computer program, when executed by a processor, performs steps of the above blockchain data processing method.

In the several embodiments provided by the present disclosure, it should be understood that the disclosed apparatus and method can be implemented in other ways. For example, the apparatus embodiments described above are only illustrative. For example, the division of the units is only a logical function division, and there may be other division manners in actual implementations, for example, multiple units or components may be combined or integrated into another system, or some features can be ignored or not be implemented. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be located in one place, or distributed on multiple network units. Some or all of the units may be selected according to actual needs to realize the objection of the solution of the embodiment.

In addition, each functional unit in the various embodiments of the present disclosure may be integrated into one processing unit, or may exist independently in physical, or two or more units may be integrated into one unit. The above integrated unit may be implemented in the form of hardware, or in the form of hardware and software functional units.

The above integrated unit implemented in the form of a software functional unit may be stored in a computer readable storage medium. The software functional unit is stored in a storage medium and includes several instructions to cause a computer device (which may be a personal computer, a server, or a network device, etc.) or a processor to execute part of the steps of the method described in the various embodiments of the present application. The forgoing storage medium includes a U disk, a mobile hard disk, a read-only memory (ROM), a random access memory (RAM), a magnetic disk or an optical disk and other mediums that can store program codes.

Those skilled in the art may clearly understand that, for the convenience and conciseness of the description, the above division of the functional modules is only used as an example for explanation. In practical applications, the above functions may be allocated to different functional modules for completion as required; that is, an internal structure of the apparatus is divided into different functional modules to complete all or part of the functions described above. For the specific working process of the apparatus described above, reference may be made to the corresponding process in the forgoing method embodiments, which will be not repeated here.

After considering the specification and practicing the disclosure disclosed herein, those skilled in the art will easily think of other implementation solutions of the present disclosure. The present disclosure is intended to cover any variations, uses, or adaptive changes of the present disclosure. These variations, uses, or adaptive changes follow the general principles of the present disclosure and include common knowledge or conventional technical means in the technical field that are not disclosed by the present disclosure. The specification and the embodiments are only regarded as illustrative, and the true scope and spirit of the present disclosure are indicated by the following claims.

It should be understood that the present disclosure is not limited to the precise structure that has been described above and shown in the drawings, and various modifications and changes may be made without departing from the scope thereof. The scope of the present disclosure is only limited by the appended claims.

The invention claimed is:

1. A blockchain data processing method, comprising:
analyzing a Value in Key-Value data to determine a data type of the Value when the Key-Value data needs to be stored, wherein the Key-Value data is blockchain data of a Key-Value structure;
determining a target table corresponding to the data type of the Value according to a data type information table, wherein the data type information table is used to store storage information of all data types, and storage information of the data type comprises a table corresponding to the data type, a mapping relationship between a service field of the Value of the data type and a table field in a corresponding table, and a data format of the Value of the data type; and
writing the Key-Value data into the target table according to the data type information table,
wherein the Value comprises a data type, a data format, a number of fields, and a value of the Value, and
wherein the determining the target table corresponding to the data type of the Value according to the data type information table comprises:
judging whether the data type of the Value exists in the data type information table;
acquiring the storage information of the data type of the Value from the data type information table if the data type of the Value exists in the data type information table;
judging whether the data format and the number of fields in the Value are consistent with the data format and the number of fields in storage information according to the storage information of the data type of the Value; and
acquiring the target table corresponding to the data type of the Value from the data type information table if the data format and the number of fields in the Value are consistent with the data format and the number of fields in the storage information.

2. The method according to claim 1, after judging whether the data type of the Value exists in the data type information table, further comprising:
acquiring a new table matching the number of fields of the data type of the Value as the target table if the data type of the Value does not exist in the data type information table; and
updating the storage information of the data type of the Value in the data type information table according to the new table.

3. The method according to claim 1, after judging whether the data format and the number of fields in the Value are consistent with the data format and the number of fields in the storage information according to the storage information of the data type of the Value, further comprising:
acquiring a new table matching the number of fields of the data type of the Value as the target table if the data format of the Value is inconsistent with the data format in the storage information, or if the number of fields of the Value is inconsistent with the number of fields in the storage information; and
updating the storage information of the data type of the Value in the data type information table according to the new table.

4. The method according to claim 1, after acquiring the target table corresponding to the data type of the Value from the data type information table if the data format and the number of fields in the Value are consistent with the data format and the number of fields in the storage information, further comprising:

determining a current state of the target table, wherein the current state of the target table comprises a writable state and a non-writable state;

acquiring a new table matching the number of fields of the data type of the Value as a target table if the target table is in the non-writable state; and updating the storage information of the data type of the Value in the data type information table according to the new table; and executing a step of writing the Key-Value data into the target table according to the data type information table if the target table is in the writable state.

5. The method according to claim 4, before determining the current state of the target table, further comprising:

detecting whether a number of rows of the target table reaches a preset threshold; and updating the state of the target table to the non-writable state if the number of rows of the target table reaches the preset threshold.

6. The method according to claim 1, wherein the writing the Key-Value data into the target table according to the data type information table comprises:

writing a Key of the Key-Value data into a specified field of the target table; and writing a value of the service field of the Value into a corresponding table field in the target table according to the storage information of the data type of the Value.

7. The method according to claim 1, wherein the method further comprises:

acquiring a Key, a data type and a service field of data to be queried in response to a data query request of a blockchain system;

querying the data type information table according to the data type of the data to be queried to determine a table corresponding to the data type of the data to be queried; and querying the table corresponding to the data type of the data to be queried according to the Key and the service field of the data to be queried to obtain a query result.

8. The method according to claim 7, after obtaining the query result, further comprising:

encapsulating the query result as the Value according to the data format of the Value of the data type of the data to be queried.

9. The method according to claim 1 wherein:

acquiring a query statement in response to a data query request of a blockchain system;

analyzing the query statement to determine a data type and a service field of the data to be queried;

replacing the data type in the query statement with a corresponding table name and replacing the service field in the query statement with a corresponding table field to generate a new query statement according to storage information of the data type of the data to be queried; and executing the new query statement to obtain a query result.

10. The method according to claim 9, after obtaining the query result, further comprising:

encapsulating the query result as Key-Value data according to the data format of the Value of the data type of the data to be queried.

11. A blockchain data processing apparatus, comprising: a processor, a memory, and a computer program stored in the memory and executed by the processor; when the processor executes the computer program, the processor is configured to:

analyze a Value in Key-Value data to determine a data type of the Value when the Key-Value data needs to be stored, wherein the Key-Value data is blockchain data of Key-Value structure;

determine a target table corresponding to the data type of the Value according to a data type information table, wherein the data type information table is used to store storage information of all data types, and storage information of the data type comprises a table corresponding to the data type, a mapping relationship between a service field of the Value of the data type and a table field in a corresponding table, and a data format of the Value of the data type; and write the Key-Value data into the target table according to the data type information table;

wherein the Value comprises a data type, a data format, a number of fields, and a value of the Value, and wherein the processor is further configured to:

judge whether the data type of the Value exists in the data type information table;

acquire the storage information of the data type of the Value from the data type information table if the data type of the Value exists in the data type information table;

judge whether the data format and the number of fields in the Value are consistent with the data format and the number of fields in storage information according to the storage information of the data type of the Value; and acquire the target table corresponding to the data type of the Value from the data type information table if the data format and the number of fields in the Value are consistent with the data format and the number of fields in the storage information.

12. The apparatus according to claim 11, wherein the processor is further configured to:

acquire a Key, a data type and a service field of data to be queried in response to a data query request of a blockchain system;

query the data type information table according to the data type of the data to be queried to determine a table corresponding to the data type of the data to be queried; and query the table corresponding to the data type of the data to be queried according to the Key and the service field of the data to be queried to obtain a query result.

13. The apparatus according to claim 12, after judging whether the data type of the Value exists in the data type information table, the processor is further configured to:

acquire a new table matching the number of fields of the data type of the Value as the target table if the data type of the Value does not exist in the data type information table; and update the storage information of the data type of the Value in the data type information table according to the new table.

14. The apparatus according to claim 12, after judging whether the data format and the number of fields in the Value are consistent with the data format and the number of fields in the storage information according to the storage information of the data type of the Value, the processor is further configured to:

acquire a new table matching the number of fields of the data type of the Value as the target table if the data format of the Value is inconsistent with the data format in the storage information, or if the number of fields of the Value is inconsistent with the number of fields in the storage information; and update the storage information of the data type of the Value in the data type information table according to the new table.

15. The apparatus according to claim 11, wherein the processor is further configured to:

acquire a query statement in response to a data query request of a blockchain system;

analyze the query statement to determine a data type and a service field of the data to be queried;

replace the data type in the query statement with a corresponding table name and replace the service field in the query statement with a corresponding table field to generate a new query statement according to storage information of the data type of the data to be queried; and execute the new query statement to obtain a query result.

16. The apparatus according to claim 15, after acquiring a new table matching the data format and the number of fields in the storage information as a target table, the processor is further configured to:

determine a current state of the target table, wherein the current state of the target table comprises a writable state and a non-writable state;

acquire a new table matching the number of fields of the data type of the Value as a target table if the target table is in the non-writable state; and updating the storage information of the data type of the Value in the data type information table according to the new table; and execute a step of writing the Key-Value data into the target table according to the data type information table if the target table is in the writable state.

17. The blockchain data processing apparatus according to claim 11, wherein the blockchain data processing apparatus comprises a chip.

18. A non-transitory computer-readable storage medium, having a computer program stored thereon, when the computer program is executed by a processor, the following steps are implemented:

analyzing a Value in Key-Value data to determine a data type of the Value when the Key-Value data needs to be stored, wherein the Key-Value data is blockchain data of Key-Value structure;

determining a target table corresponding to the data type of the Value according to a data type information table, wherein the data type information table is used to store storage information of all data types, and storage information of the data type comprises a table corresponding to the data type, a mapping relationship between a service field of the Value of the data type and a table field in a corresponding table, and a data format of the Value of the data type; and writing the Key-Value data into the target table according to the data type information table, wherein the Value comprises a data type, a data format, a number of fields, and a value of the Value, and wherein the determining the target table corresponding to the data type of the Value according to the data type information table comprises:

judging whether the data type of the Value exists in the data type information table;

acquiring the storage information of the data type of the Value from the data type information table if the data type of the Value exists in the data type information table;

judging whether the data format and the number of fields in the Value are consistent with the data format and the number of fields in storage information according to the storage information of the data type of the Value; and acquiring the target table corresponding to the data type of the Value from the data type information table if the data format and the number of fields in the Value are consistent with the data format and the number of fields in the storage information.

* * * * *